US 6,744,210 B2

(12) United States Patent
Petrick

(10) Patent No.: US 6,744,210 B2
(45) Date of Patent: *Jun. 1, 2004

(54) SEALED BEAM HIGH INTENSITY DISCHARGE LAMP SYSTEM FOR AIRCRAFT

(75) Inventor: John T. Petrick, Oldsmar, FL (US)

(73) Assignee: Goodrich Lighting Systems, Inc., Oldsmar, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/023,612

(22) Filed: Dec. 18, 2001

(65) Prior Publication Data

US 2002/0093289 A1 Jul. 18, 2002

Related U.S. Application Data

(63) Continuation of application No. 09/470,851, filed on Dec. 23, 1999, now Pat. No. 6,376,992.

(51) Int. Cl.⁷ .............................. B60Q 1/02; H01J 7/44
(52) U.S. Cl. ..................... 315/82; 307/10.6; 307/10.8; 315/56
(58) Field of Search ........................... 315/82, 77, 134, 315/149, 56, 363; 313/25, 317, 567; 307/10.1, 10.6, 10.8

(56) References Cited

U.S. PATENT DOCUMENTS

| 3,786,553 A | * | 1/1974 | Ma ............................ 29/896.2 |
| 4,275,433 A | | 6/1981 | Caldwell ..................... 362/22 |
| 4,276,580 A | | 6/1981 | Rogers ........................ 362/22 |
| 4,345,178 A | | 8/1982 | Pappas et al. ............... 313/113 |
| 4,463,277 A | | 7/1984 | DeCaro ....................... 313/25 |
| 4,720,652 A | | 1/1988 | DuBois, Jr. .................. 313/25 |
| 4,937,717 A | | 6/1990 | Betzvog ....................... 362/310 |
| 4,939,408 A | | 7/1990 | Gibson, III ................... 313/25 |
| 5,578,905 A | | 11/1996 | Graber ......................... 315/76 |
| 5,634,820 A | | 6/1997 | Vakil ........................... 439/646 |
| 5,887,966 A | | 3/1999 | Eissner et al. ............... 362/153.1 |
| 6,111,359 A | | 8/2000 | Work et al. .................. 313/25 |
| 6,124,673 A | * | 9/2000 | Bishop ......................... 315/56 |

FOREIGN PATENT DOCUMENTS

FR 2714454 6/1995

* cited by examiner

Primary Examiner—Wilson Lee
Assistant Examiner—Thuy Vinh Tran
(74) Attorney, Agent, or Firm—Renner, Otto, Boisselle & Sklar, LLP

(57) ABSTRACT

A system for enabling successful use of HID lamps in aircraft, including in particular high power lamps for use as landing lights and taxi lights, utilizes a sealed beam HID lamp which during normal operation has an external temperature considerably lower than the external temperature of a quartz halogen or incandescent sealed beam lamp of equivalent light output. The lower external temperature arises in part from the use of a gas fill in the sealed beam. A detector is provided to monitor the seal integrity of the sealed beam HID lamp and further to provide a response to seal failure resulting in disablement of the lamp. Exemplary ways for accomplishing seal failure detection include radioactive detection, pressure monitoring, and chemical sensing, or other ways wherein detection of a failed seal is followed by an electrical output used to terminate or preclude lamp operation.

10 Claims, 8 Drawing Sheets

SEALED BEAM HIGH INTENSITY DISCHARGE LAMP SYSTEM FOR AIRCRAFT

This application is a continuation of prior U.S. patent application Ser. No. 09/470,851 filed Dec. 23, 1999, now U.S. Pat. No. 6,376,992.

FIELD OF THE INVENTION

The present invention relates to aircraft lighting and, more particularly, to a sealed beam high intensity discharge lamp system for an aircraft.

BACKGROUND OF THE INVENTION

High intensity discharge (HID) lamps offer significant advantages over other lamps conventionally used in aircraft applications, such as quartz halogen or incandescent sealed beam lamps used as utility/cargo bay lights, wing and engine scan lights, logo lights, landing lights and taxi lights. When compared with quartz halogen lamps, HID lamps provide (i) nearly twice the photometric performance at less than half the energy consumption, (ii) extended lamp life by a factor of about four, (iii) better shock resistance and (iv) less heat generation.

U.S. Pat. No. 4,345,178 describes a high intensity reflector lamp intended for use in a commercial aircraft for landings at night. The lamp comprises an arc discharge tube mounted cross axially within a parabolic reflector. The parabolic reflector is sealed to a cover glass with the body of arc tube located at about the focus of the parabolic reflector. To minimize the possibility of high voltage arc-over, the envelope formed by the reflector and cover glass is filled with nitrogen at about one atmosphere of pressure.

While the aforesaid patent forecasts the use of a high intensity reflector lamp in commercial aircraft, no explanation is given to how this may be successfully accomplished. In fact, most if not all commercial aircraft today use quartz halogen or incandescent sealed beam lamps as utility/cargo bay lights, wing and engine scan lights, logo lights, landing lights and taxi lights. As an exception, low power (50 Watts or less) HID lamps are today manufactured for use in aircraft, but these lamps do not use a sealed beam.

SUMMARY OF THE INVENTION

The present invention provides a system for enabling successful use of HID lamps in aircraft, including in particular high power lamps for use as landing lights and taxi lights. To this end, the invention utilizes a sealed beam HID lamp which during normal operation has an external temperature considerably lower than the external temperature of a quartz halogen or incandescent sealed beam lamp of equivalent light output. This enables the HID lamp to be located in areas that are susceptible to potentially explosive fuel vapor concentrations without the need for explosion proof containment structure, with resultant benefits in weight and cost reduction. The lower external temperature also permits increased usage of advanced composite materials in-aircraft structure that cannot be used with conventional landing and taxi lights. In particular, some structural composite materials such as fiber reinforced epoxies or polyimides are susceptible to thermal damage at temperatures above 120° C.–180° C. Conventional landing and taxi lights operate at temperature that may damage these composites.

The lower external temperature arises in part from the use of a gas fill in the sealed beam. Among other things the gas fill provides for convective cooling of the lamp especially at high altitudes, and provides a constant internal pressure which prevents internal arcing from internal electrodes to any surrounding conductors such as the reflective surface of the reflector which may be conductive. According to the invention, a detector is provided to monitor the seal integrity of the sealed beam HID lamp, particularly a hermetically sealed lamp, and further to provide a response to seal failure resulting in disablement of the lamp. Exemplary means for accomplishing seal failure detection include radioactive detection, pressure monitoring, and chemical sensing, or other means wherein detection of a failed seal is followed by an electrical output used to inhibit lamp operation, as by terminating or precluding lamp operation.

Thus, according to the present invention, a high intensity discharge lamp system comprises a sealed beam HID lamp, lamp power control circuitry, and a seal integrity sensing device which monitors the seal integrity of the lamp and inhibits lamp operation upon detection of a loss of seal integrity.

In an embodiment, the sealed beam HID lamp includes an enclosure filled with a gas including radioactive elements, and the seal integrity sensing device includes a radiation sensor for sensing radiation emitted by the radioactive elements.

In another embodiment, the sealed beam HID lamp includes an enclosure filled with a gas, and the seal integrity sensing device includes a pressure transducer for sensing the pressure of the gas.

In a further embodiment, the sealed beam HID lamp includes an enclosure filled with a gas, and the seal integrity sensing device includes a sensor for sensing at least one component of the gas.

The present invention also provides a high intensity discharge lamp system comprising a shroud, a HID lamp ignitor housed within the shroud, and a sealed beam HID lamp removably mounted to the lamp ignitor within the shroud.

In one embodiment, the lamp has connecting pins protruding from the rear thereof, and the ignitor has receptacles for receiving the connecting pins. The connecting pins are surrounded by a rubber boot.

In an embodiment, the lamp ignitor is connected by a cable to a ballast separate from the shroud.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION

Figure 1:
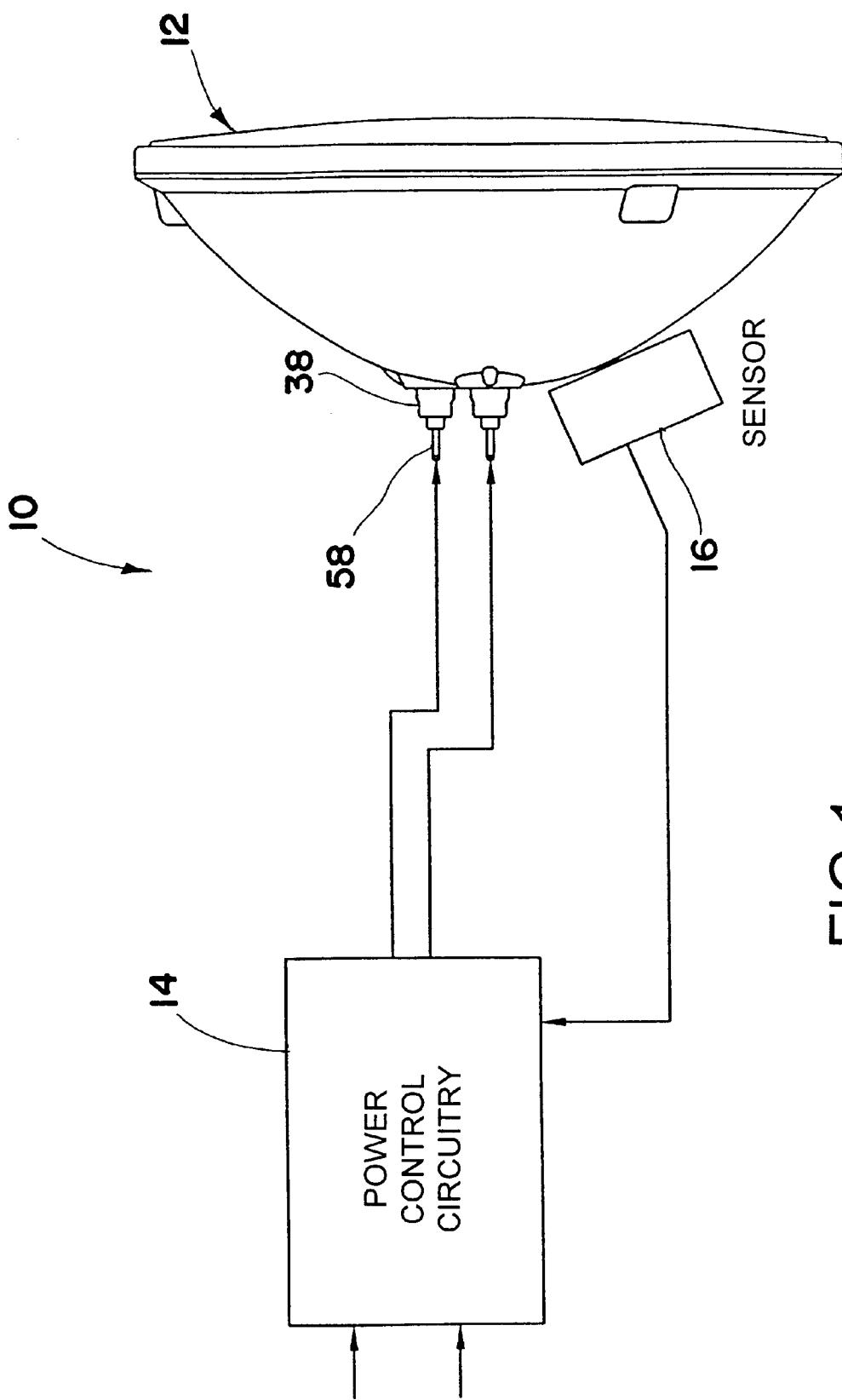
FIG. 1 is a schematic illustration of a sealed beam HID lamp system according to the invention.

Referring now in detail to the drawings, and initially to FIG. 1, reference numeral 10 generally designates an embodiment of a sealed beam high intensity discharge (HID) lamp system according with the present invention. The system 10 was developed for use in an aircraft and is herein described chiefly in this context. However, those skilled in the art will appreciate that a system according to the invention, and its attendant advantages, will have other useful applications including but not limited to uses in other types of vehicles, in industrial applications, etc. It should be appreciated that such alternative applications are contemplated as falling within the scope of the present invention. It also should be appreciated that references herein to top and bottom, upper and lower, etc., are made in relation to the illustrated orientation of the light to describe positional relationships between components of the light and not by way of limitation, unless so indicated.

The system 10 generally comprises a sealed beam HID lamp 12, lamp power control circuitry 14 and a seal integrity sensing device 16. These components are further described below.

Figure 2:
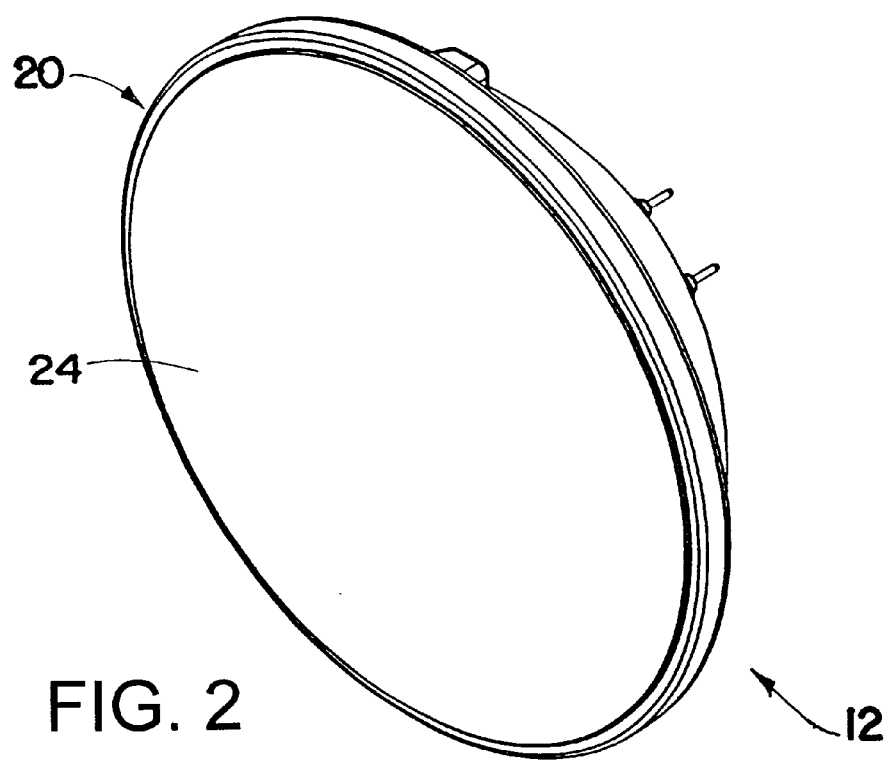
FIG. 2 is a front perspective view of a HID lamp employed in the system of FIG. 1.
Figure 3:
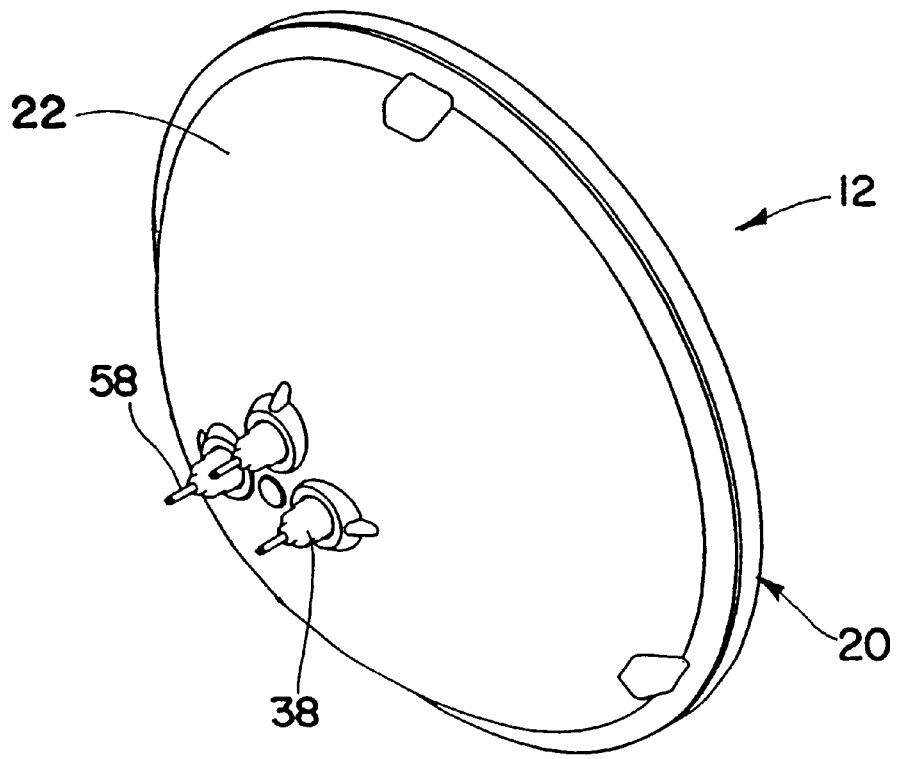
FIG. 3 is a rear perspective view of a HID lamp employed in the system of FIG. 1.
Figure 4:
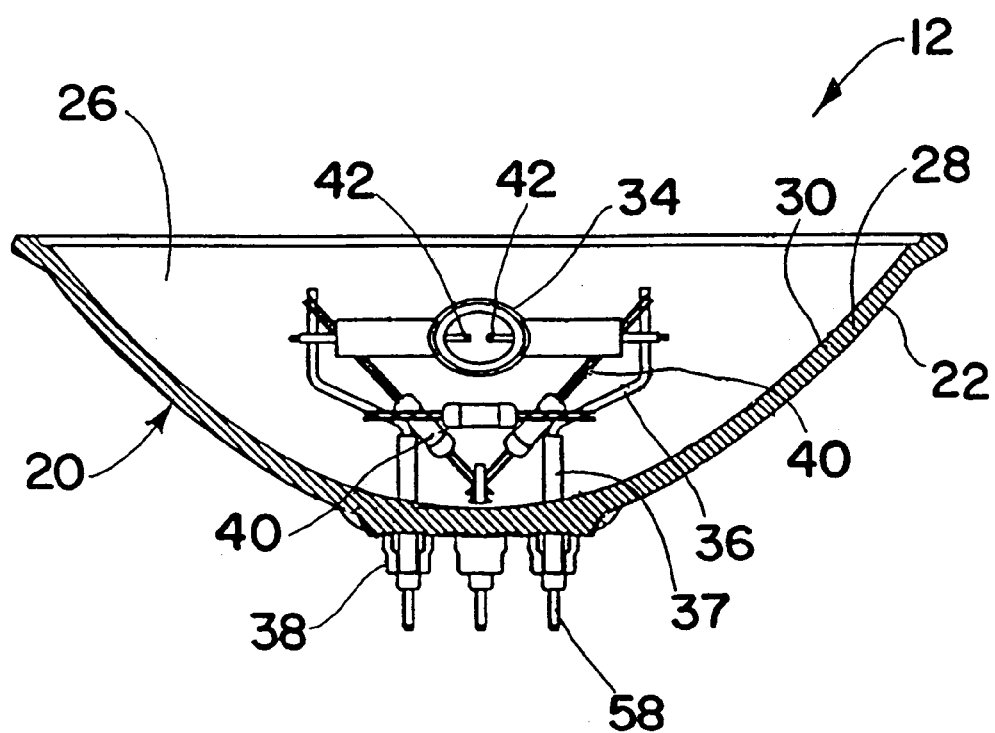
FIG. 4 is a cross-sectional view of the HID lamp.

As seen in FIGS. 2–4, the sealed beam HID lamp 12 includes an envelope 20 having an outer shell formed by a reflector 22 and a cover lens 24. The reflector 22 and cover lens 24 define gas-tight enclosure 26 preferably filled with an inert (non-reactive) gas. A preferred gas is helium, although other gases may be used such as carbon dioxide, nitrogen, argon, etc. The fill pressure preferably is about 1 atmosphere, although higher pressures will improve the dielectric breakdown characteristics. As will be appreciated, the pressurized enclosure provides a constant internal pressure which prevents internal arcing from the below described electrodes to any surrounding conductive reflective surface, such as the below described reflective coating on the reflector. The reflector 22 and cover lens 24 can be formed of glass, plastic or other suitable material and can be secured together to form a gas-tight seal about their mating peripheries by conventional means such as an epoxy adhesive, fusion sealing, mechanical fasteners or the like. A hermetic seal may be effected by well known techniques such as by brazing, welding or melting glass to produce an airtight enclosure. In the illustrated embodiment the reflector 22 includes a parabolic shape glass body 28 which has a reflective surface 30 formed by a reflective coating such as a vacuum deposited aluminum. The cover lens 24 is formed of clear polycarbonate plastic or other suitable transparent material.

The envelope 20 contains therein a high intensity discharge bulb 34 such as a HID metal halide bulb. Metal halide bulbs and the like are of the type that requires a high voltage pulse for ignition, the source of which is described below. The bulb 34 is supported on two lead-in support wires 36 which extend through and are hermetically sealed to the back of reflector 22, such as by the use of quartz pass-through tubes and metal ferrules 38 which are glass-to-glass and/or glass-to-metal sealed. A glass-to-glass seal may be provided by using a feed-through metallic pin which has a bead of thermal expansion coefficient matching glass attached thereto. When melted using a heating device the bead melts and fuses to the reflector thereby producing a hermetic seal. A glass-to-metal seal may be formed by thermally fusing a thermal expansion matching glass donut to the back of the reflector and subsequently fusing the donut to the lead-in support wires to effect a hermetic seal.

The bulb 34 is further held in place by isolation supports 40. The isolation supports may be short tubes or rods of glass or quartz having a short length of high tensile strength wire fused within each end of the tube or rod without any end-to-end connectivity. The wires at opposite ends of the tube or rod may be affixed respectively to a lead-in support wire 36 and to the reflector 22 to provide mechanical stability during vibration and shock conditions.

The bulb 34 includes a pair of electrodes 42 between which an arc is formed when the bulb is powered, the arc providing a source of light.

In the illustrated embodiment the bulb 34 is located generally at the focal point of the reflector 22. Because the arc is typically of relatively small dimension when compared to a quartz halogen bulb, a narrow beam of light normally would be emergent from the lamp. This may be desirable for some applications. However, to match the output beam of a conventional quartz halogen landing or taxi lamp, the cover lens 24 may include an appropriate corrective configuration that spreads the light beam as needed to provide the desired output beam. Alternatively or additionally, the reflector 22 may be reconfigured to provide the desired output beam.

The illustrated HID lamp 12 is particularly suited for use as a high power landing or taxi lamp. The lamp 12 may use a bulb 34 having a wattage of at least about 100 Watts, more preferably at least about 250 Watts, or higher. A 250 Watt lamp can provide about the same light output as a conventional Quartz halogen lamp.

The HID lamp 12 is powered by the power control circuitry 14. The power control circuitry 14 includes a ballast and ignitor that control start-up and operation of the HID lamp 12, including the illuminating power and color stability, through a microprocessor (or equivalent control and monitor circuit). It also controls the lamp voltage during continuous or steady state operation. The HID lamp ballast may operate on 115 VAC 400 Hz single phase power, for example. Lamp ignition may be effected by applying to the HID lamp high frequency 2 kHz, 30 kV high voltage pulses, in 200 ms. The bursts may be immediately truncated the moment the lamp is lit. The bursts may be repeated once each second if the lamp fails to light. In the case of a malfunctioning lamp, the ignitor may stop after a preset time, typically 15 seconds. Then further attempts to re-light the lamp may be discontinued until, for instance, the main power has been manually cycled.

Figure 5:
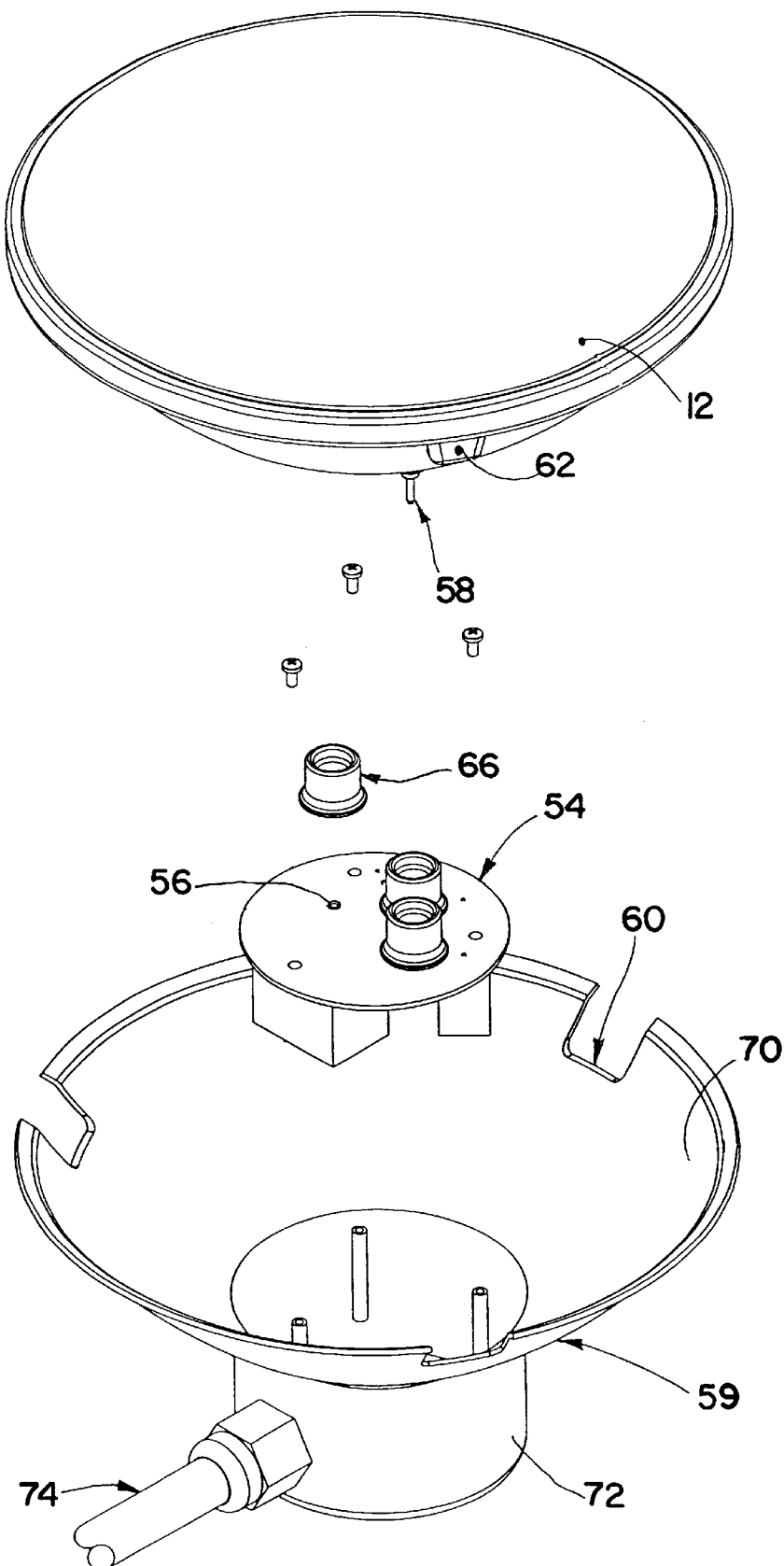
FIGS. 5 and 6 are broken continuations of an exploded perspective view of a physical embodiment of the system.
Figure 6:
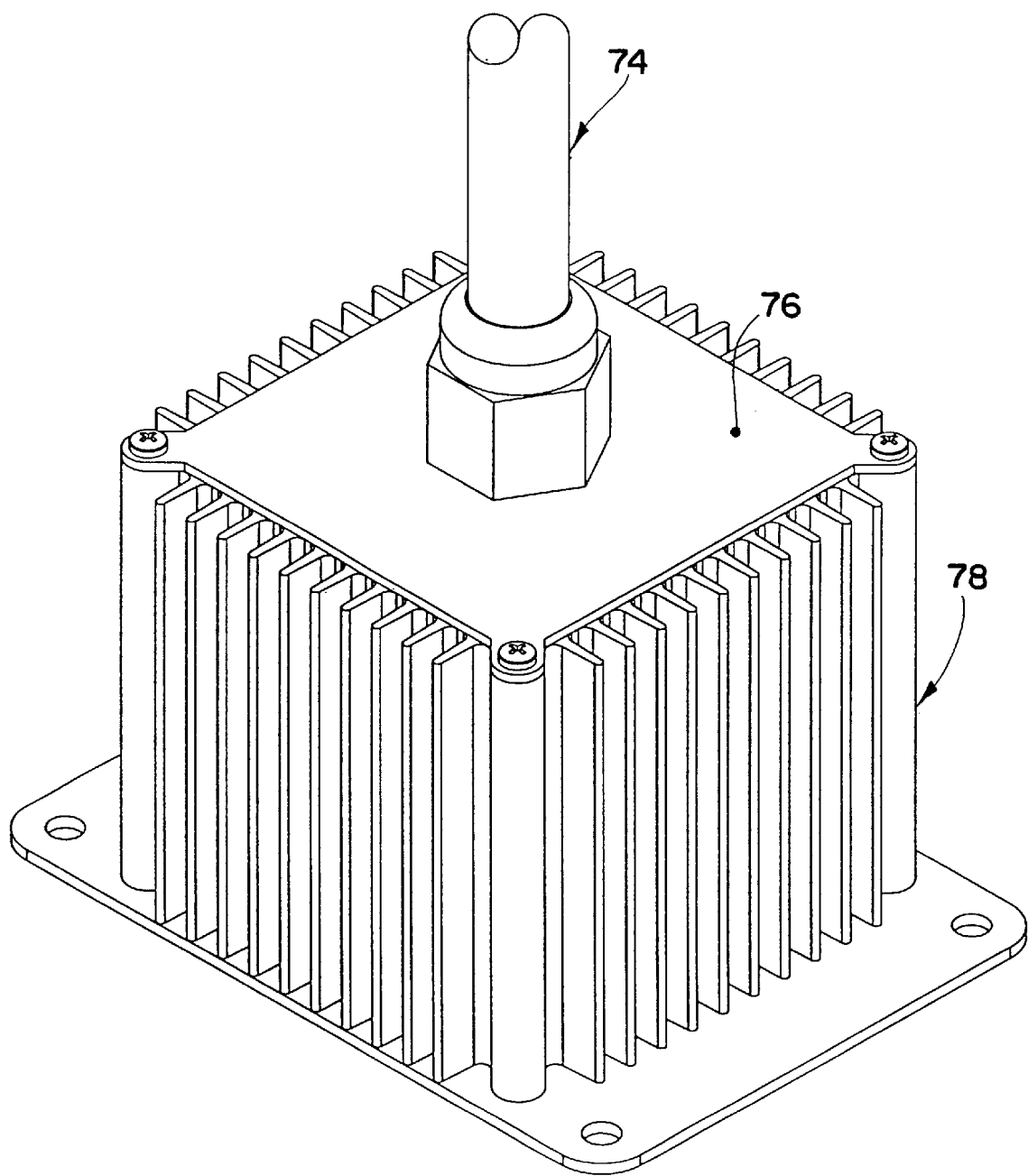

In a preferred embodiment, the ignitor circuit components are housed with the lamp 12, thereby minimizing the distance through which high voltage must travel to effect lamp startup. As shown in FIG. 5, The ignitor circuit components are disposed on an ignitor circuit board 54 to which electrical receptacles 56 are mounted. The electrical receptacles 56 receive electrode connecting pins 58 formed by the ends of the support wires 36 that project from the back side of the reflector. The electrode connecting pins 58 are inserted into the receptacles 56 when the lamp 12 is mated with a shroud or housing 59, the shroud preferably having slots 60 in which are mated tabs 62 on the back side of the lamp for properly aligning the pins 58 with the receptacles. The tabs 62 are conventionally and additionally employed to align the light with an axis of the aircraft by engaging a slot in the aircraft light mounting structure. Rubber boots 66 provide protection from the environmental elements and preferably are filled with a high dielectric strength material such as silicone grease to prevent arcing at altitude. The shroud 59 has a conical portion 70 for receiving the lamp 12 and a cylindrical base portion 72 for accommodating the ignitor 54 within the shroud. A cable 74 interconnects the ignitor 54 with a remotely located ballast 76 (FIG. 6). Preferably a shielded cable is used, and the shroud and the ballast housing 78 are metallic or otherwise rendered electrically conductive, to provide a radio frequency interference shield for the system. Also, portions of the lamp 12 may be coated with conductive materials of a transparent or opaque nature to provide complete shielding. Commercially available sprays or paints can be applied to the back of the envelope 20 to render the outer surface thereof electrically conductive particularly in the areas directly under the slots 60. The shroud 59 may be in electrical contact with the applied coating thereby providing a conductive shield precluding electromagnetic radiation through the slots 60. The clear lens 24 at the lens area thereof and any edges thereof may be coated with transparent conductive tin oxide or tin oxide/iridium oxide by a chemical vapor deposition process.

Aircraft manufacturers typically locate primary landing and taxi lamps in areas susceptible to potentially explosive fuel vapor concentrations. Prior art landing and taxi lamps of the quartz halogen or incandescent sealed beam types operate with exterior temperatures in excess of the ignition point of ranges of fuel vapor-air ratios that may be encountered. To protect against explosions, the prior art lamps have been enclosed in explosion proof containment structure having the ability to withstand an internal explosion of fuel-air mix without propagating the explosion to a surrounding region having a similar concentration of potentially explosive vapor.

As will be appreciated, an HID lamp as above described has during normal operation an external temperature considerably lower than the external temperature of a quartz halogen or incandescent sealed beam lamp of equivalent light output. This enables the HID lamp to be located in areas that are susceptible to potentially explosive fuel vapor concentrations without the need for explosion proof containment structure, with resultant benefits in weight and cost reduction. The lower external temperature arises in part from the use of a gas fill in the sealed beam. As above indicated, the gas fill provides for convective cooling of the lamp especially at high altitudes, and provides a constant internal pressure which prevents internal arcing from internal electrodes to any surrounding conductors such as the reflective surface of the reflector which may be conductive.

According to the invention, the seal integrity of sealed beam HID lamp 12 is monitored by the seal integrity sensor 16 (FIG. 1). If the seal is found to be degraded, the power control circuitry 14 is commanded to inhibit lamp operation, as by shutting-off power to the lamp or preventing the lamp from being energized. That is, a response to seal failure results in prompt disablement of electrical activation at the ballast 76 (FIG. 6). Seal integrity may be checked prior to starting the lamp so that if seal integrity has been compromised the light will be blocked from starting. Seal integrity may be monitored continuously during lamp operation whether the plane is in flight or on the ground.

The seal integrity sensing device 16 may be of any suitable type for monitoring and providing an output that can be used to effect lamp shut-down in the event of seal failure. Exemplary means for accomplishing seal failure detection include radioactive detection, pressure monitoring, and chemical sensing, or other means wherein detection of a failed seal is followed by an electrical output used to terminate or preclude ballast operation.

Figure 7:
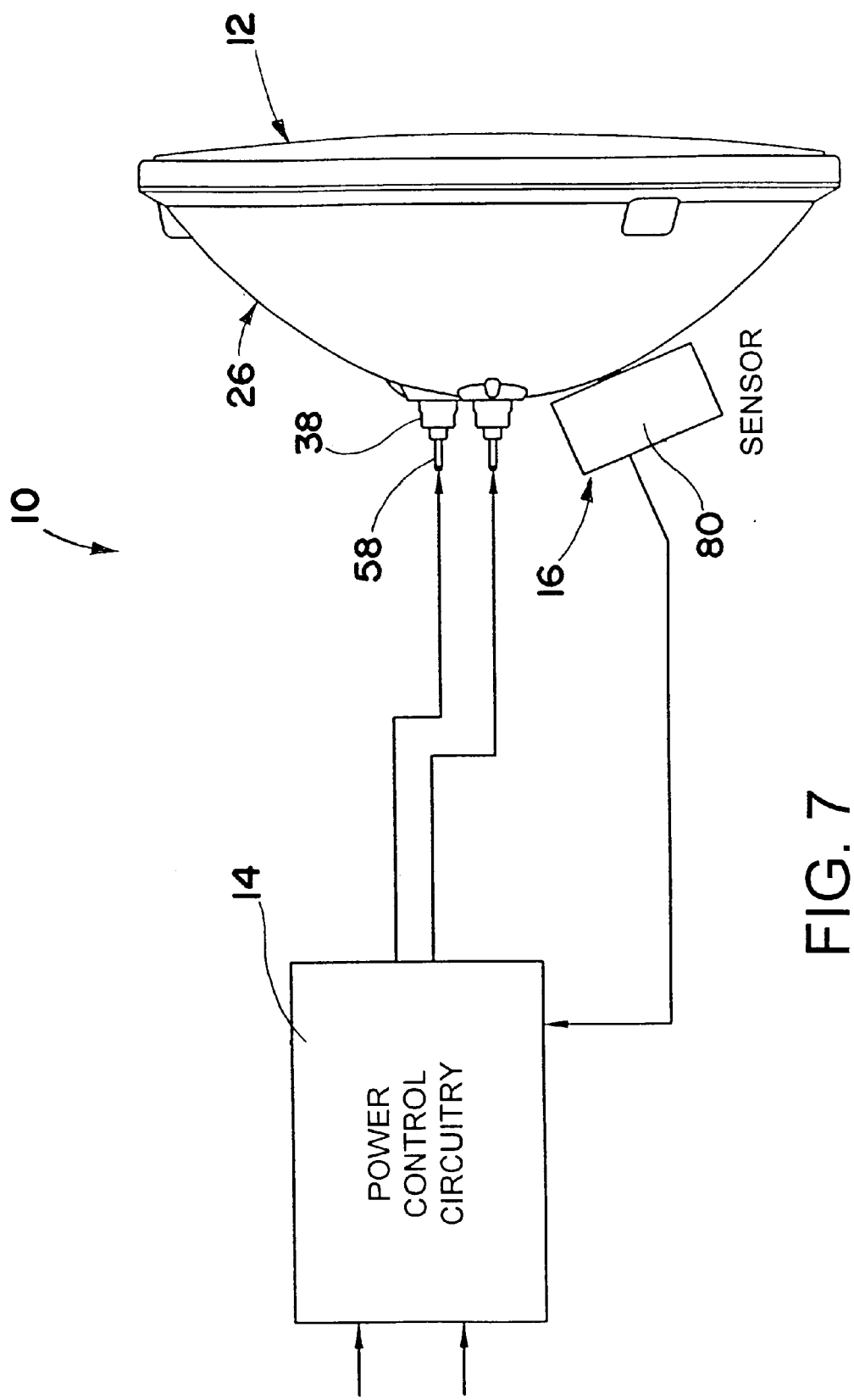
FIGS. 7–9 are schematic illustrations of a sealed beam HID lamp system with different types of seal integrity sensing devices.

In FIG. 7, the seal integrity sensing device 16 includes a radiation sensor 80 for sensing radiation emitted by radioactive nuclides added to the gas filling the enclosure 26. The sensor 80 may be positioned at a suitable location near lamp 12. For example, the sensor 80 may be integral to the ballast 76 (FIG. 6) or may be contained in the lamp ignitor circuit 54 (FIG. 5) to which the lamp 12 is detachably mounted. Should the lamp seal be compromised the radioactively doped gas will vent to the atmosphere and the sensor will detect the decreasing radiation. Upon reaching a threshold indicative of leakage of a significant portion of the gas the sensing device will produce an electrical signal which will promptly disable ballast.

Figure 8:
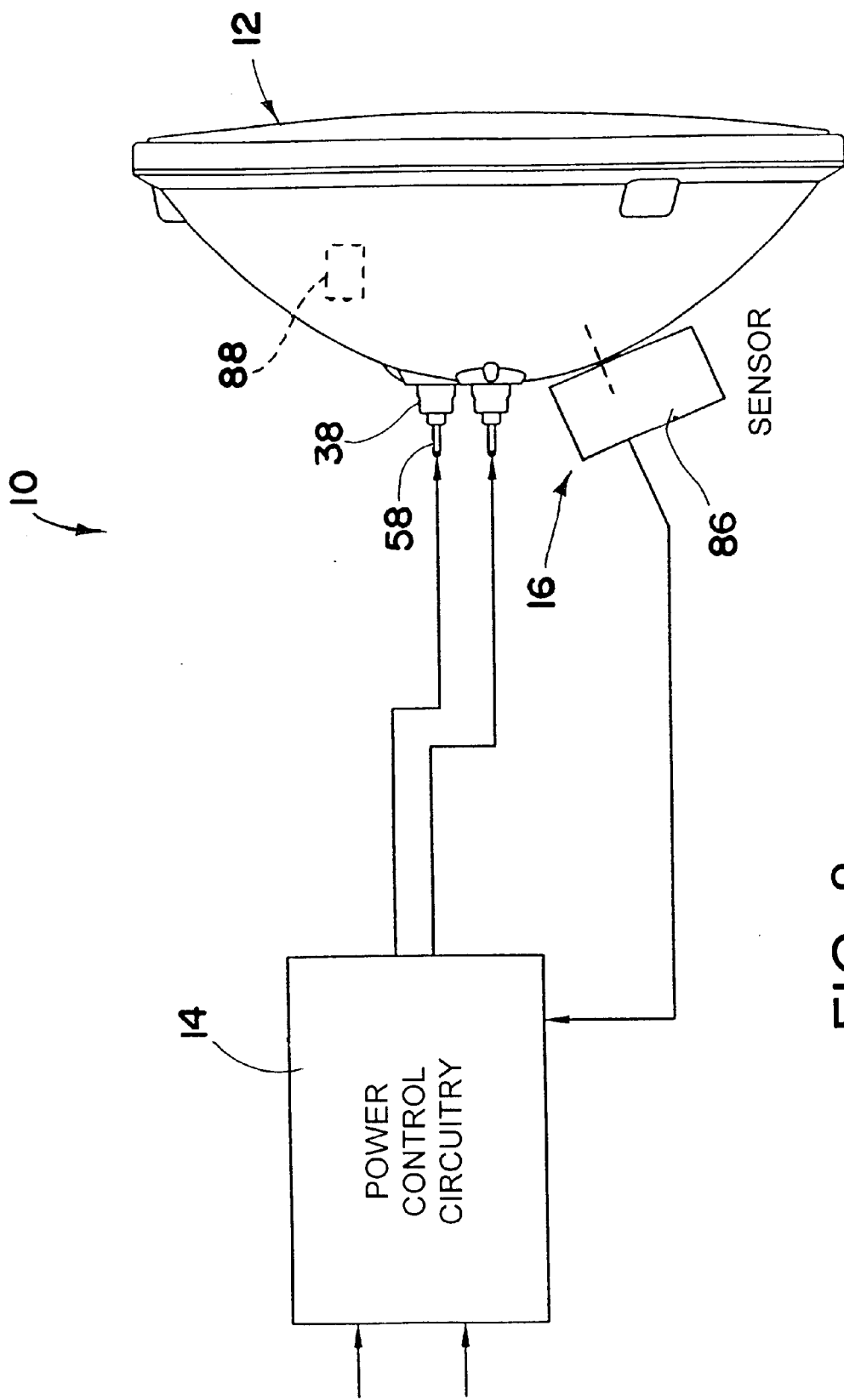

Another embodiment of seal integrity sensing device 16 is depicted in FIG. 8. In FIG. 8, the sensing device includes a pressure transducer 86 in communication with the gas inside the lamp enclosure 26. The pressure transducer may be mounted to the lamp 12 and communicate through a gas port with the gas in the lamp enclosure. Alternatively, the transducer may be mounted within lamp as depicted at 88, whereby electrical feedthroughs passing through the lamp wall will convey an electrical output signal to monitoring circuitry located outside the lamp. A further embodiment of pressure monitoring includes a bellows structure mounted internally to lamp (as depicted at 88) having one or more shunting bars which engage the lamp electrodes thereby producing an electrical short circuit when gas fill pressure drops. A Belleville spring may be used in conjunction with the bellows to produce a quick "snap" response to more rapidly and permanently short the lamp electrodes. Conventional ballasts have provision for safely terminating or precluding operation in the event of a short circuit. The pressure monitoring technique usually will require some overpressure within the lamp enclosure. The provision of this overpressure may be facilitated by the use of glass-metal interfaces for effecting the seal.

Figure 9:
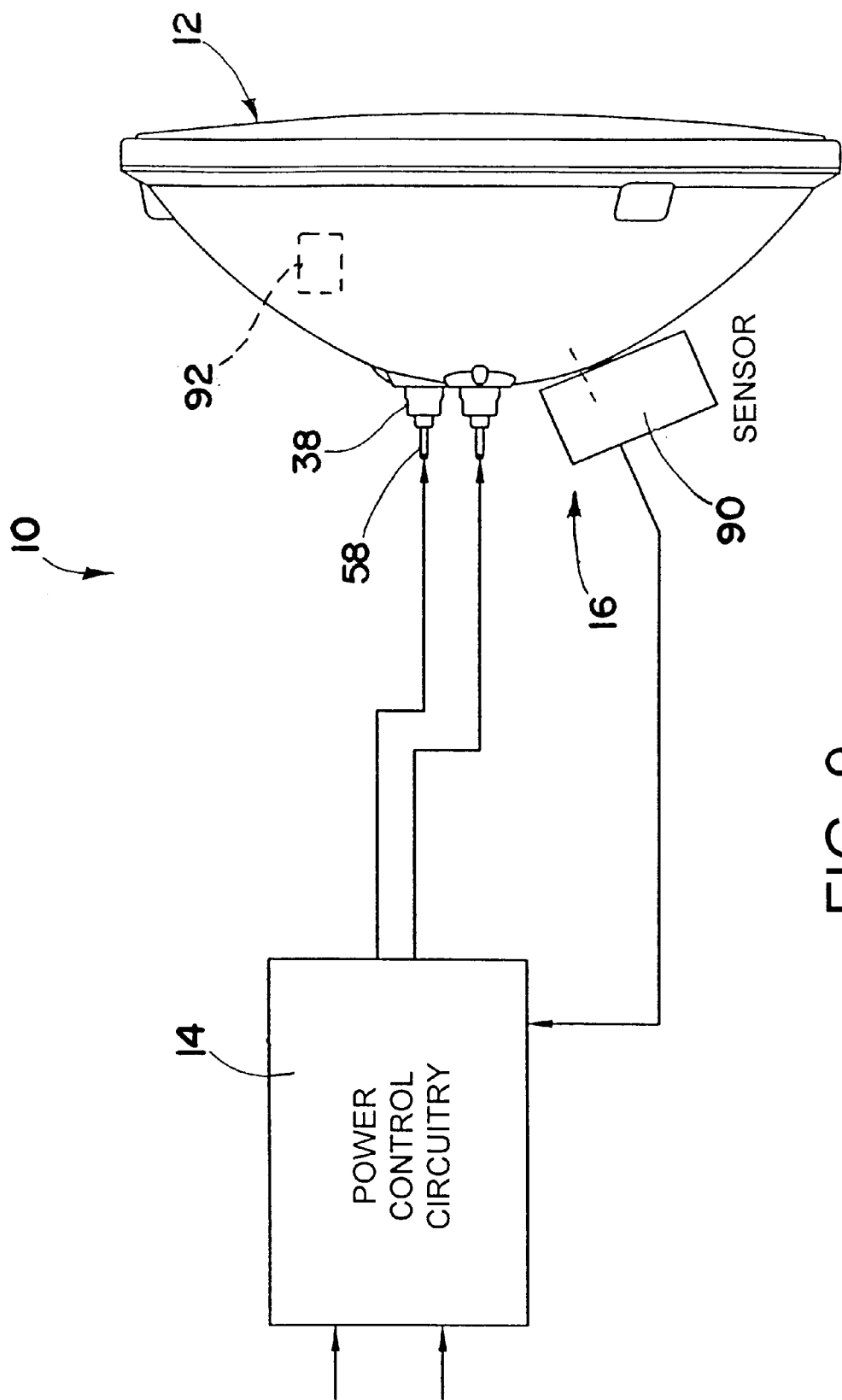

A further embodiment of seal integrity sensing device 16 is depicted in FIG. 9. This device 16 includes a sensor 90 such as a chemical sensor to detect organic fuel vapor and/or an oxygen sensor communicating with the gas in the lamp enclosure. If either oxygen or fuel vapor is detected within the lamp 12, it may be assumed that the seal has failed and any further operation will be terminated. Since other gases may be employed as the inert gas, such gases may be detected and operation terminated or precluded at internal concentrations less than a predetermined limit. Detecting the presence-absence of inert gas fill permits failure identification in the absence of fuel or oxygen.

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A high intensity discharge lamp system comprising a shroud, an HID lamp ignitor housed within the shroud, and a sealed beam HID lamp removably mounted to the lamp ignitor within the shroud.

2. A system as set forth in claim 1, wherein the lamp has connecting pins protruding from a rear thereof, and the ignitor has receptacles for receiving the connecting pins.

3. A system as set forth in claim 2, comprising an ignitor circuit board to which components of the ignitor are mounted, and wherein the receptacles are mounted to the ignitor circuit board.

4. A system as set forth in claim 1, comprising an ignitor circuit board to which components of the ignitor are mounted.

5. A high intensity discharge lamp system comprising a shroud, an HID lamp ignitor housed within the shroud, and a sealed beam HID lamp removably mounted to the lamp ignitor within the shroud; wherein the lamp has connecting pins protruding from a rear thereof, the ignitor has receptacles for receiving the connecting pins, and at least one of the connecting pins is surrounded by a rubber boot.

6. A system as set forth in claim 5, wherein the rubber boot is filled with a high dielectric strength material to prevent arcing at altitude.

7. A system as set forth in claim 6, wherein the high dielectric strength material is silicone grease.

8. A high intensity discharge lamp system comprising a shroud, an HID lamp ignitor housed within the shroud, and a sealed beam HID lamp removably mounted with respect to the lamp ignitor within the shroud, wherein the lamp ignitor is connected by a cable to a ballast separate from and located outside the shroud.

9. A high intensity discharge lamp system comprising a shroud, an HID lamp ignitor housed within the shroud, and a sealed beam HID lamp removably mounted to the lamp ignitor within the shroud; wherein the shroud has a conical portion for receiving the lamp and a cylindrical base portion for accommodating the ignitor within the shroud.

10. A high intensity discharge lamp system comprising a shroud, an HID lamp ignitor housed within the shroud, and a sealed beam HID lamp removably mounted to the lamp ignitor within the shroud; wherein the shroud has a first portion for receiving the lamp and a base portion for accommodating the ignitor within the shroud.

* * * * *